United States Patent
Karidis

[11] Patent Number: 6,118,192
[45] Date of Patent: Sep. 12, 2000

[54] APPLICATIONS OF MICRO-ELECTRO-MECHANICAL WOBBLE MOTORS AS RADIO FREQUENCY TRANSCEIVER COMPONENTS

[75] Inventor: John P. Karidis, Ossining, N.Y.

[73] Assignee: International Business Machines Corporation, Armonk, N.Y.

[21] Appl. No.: 09/282,576

[22] Filed: Mar. 31, 1999

[51] Int. Cl.[7] .............................. H02N 1/00; H02K 11/00; H02K 7/00

[52] U.S. Cl. .................. 310/68 R; 310/40 MM; 310/309

[58] Field of Search .......................... 310/40 MM, 68 A, 310/309, 82, 71; 340/68 E, 825

[56] References Cited

U.S. PATENT DOCUMENTS

| | | | |
|---|---|---|---|
| 5,142,932 | 9/1992 | Moya et al. | 74/490.05 |
| 5,237,234 | 8/1993 | Jebens et al. | 310/309 |
| 5,252,870 | 10/1993 | Jacobsen et al. | 310/82 |

*Primary Examiner*—Nestor Ramirez
*Assistant Examiner*—Guillermo Perez
*Attorney, Agent, or Firm*—Bernard D. Bogdon; Andrew Dillon

[57] ABSTRACT

Devices for use in highly integrated radio frequency transceivers utilize microelectro-mechanical systems, or wobble motors, to form superior switches and to select and vary components that determine different frequencies of operation. Each device has a substrate with concentric rings of electrodes and contacts. A circular rotor is centrally pivoted or wobbled to engage the contacts along its circumferential edge. The rotor may be mechanically or materially modified to create symmetric or asymmetric forms which interact with one or more stationary capacitor electrodes on the substrate. The positioning of the rotor forms in terms of rotation, overlap and separation, relative to the capacitor electrodes, varies the capacitance.

37 Claims, 9 Drawing Sheets

APPLICATIONS OF MICRO-ELECTRO-MECHANICAL WOBBLE MOTORS AS RADIO FREQUENCY TRANSCEIVER COMPONENTS

BACKGROUND OF THE INVENTION

Technical Field

This invention relates in general to micro-electromechanical systems devices and in particular to applying a micro-electro-mechanical wobble motor as a radio frequency transceiver component.

Background Art

Radio designers would like to create a highly integrated radio which can switch between many different radio bands. The radio would be packed as a single-chip or a two-chip stack, if possible. Such a transceiver would allow a single, compact cellular handset to be used on many different worldwide cellular systems.

One approach to creating this is to use micro-electromechanical systems (MEMS) techniques to create components on cooperatively positionable chips that allow the radio to be rapidly and electronically reconfigured for various transmit and receive frequencies. These components would include switches, variable capacitors, inductors and other passive or active elements. Typical steps for reconfiguration might include switching of various fixed-value passive devices (i.e. capacitors, inductors, resistors, etc.) into and out of the radio circuitry, and/or adjusting the value of one or more of these devices over some finite but preferably wide range.

In principle, MEMS could create the necessary switches and variable capacitors. It can also be used to integrate many or all of the passive components onto a single substrate, which may or may not be the same substrate used by the rest of the radio circuitry. However, current MEMS switches and variable capacitors have suffered from various problems. In particular, these switches have required higher than desirable voltage levels for actuation. This is especially true for capacitively-actuated, cantilever beam-type switches where the gap is initially rather large, thus requiring higher voltages. In addition, the only force acting to release this type of switch is the spring force of the cantilever, which can lead to stiction problems since the beam must be soft enough to be easily pulled down.

As for variable capacitors, one prior art approach made the capacitor out of a thin membrane or beam suspended over a base surface. The separation distance between the beam and the base is controlled electrostatically. Unfortunately, these variable capacitors can have problems related to the non-linearity of gap versus applied voltage. They are also susceptible to undesirable changes in capacitance as a result of acceleration and microphonic effects.

Wobble motors are known in the MEMS field and come in at least two forms. The first type operates entirely within a single plane (not shown). It uses a rotor with a slight amount of clearance either on the inner (shaft) diameter, or around the outside diameter of the rotor. In this design, the rotor can be pulled in a finite number of radial directions through the use of a series of electrodes or electromagnet elements positioned around the rotor. When one of these electrostatic or electromagnetic "poles" is energized, the rotor moves radially toward that pole until the small amount of clearance has been eliminated. Subsequently, the poles around the rotor can be energized in series around the circle. This causes the rotor to roll around the center shaft or the external contact point between the outside of the rotor and the stator, depending on the type of wobble motor. This rolling motion causes a very slight rotation of the entire rotor each time the energization of the poles completes one "electrical" cycle.

The second type of wobble motor uses a flat circular rotor which sits atop a small bump at its center. If the rotor were to remain flat, there would be a small gap between the bottom edge of the perimeter of the rotor and the substrate below. With this type, each of the poles which are situated around the rotor can be energized to pull the edge of the rotor nearest that pole down until it is in contact with the substrate. The pole forces act in directions which are parallel to the rotational axis of the wobble motor, rather than in radial directions as is done with the previous type. Energizing the poles in series will cause the contact point between the rotor and the substrate to rotate around the circle. Because of the slight tilting angle of the rotor, the radius of the circle of contact created by the successive contact points between the rotor and the substrate is slightly smaller than the radius of the rotor itself. Therefore, as long as there is no slippage at the contact point, the rotor will rotate very slightly each time the energization of the poles complete one cycle.

A critical aspect of both types of wobble motors is that they can function with extremely small gaps between the driving poles and the rotor. For example, with the second type, if the rotor is tilted toward one edge at "3-o'clock", it would not be practical to directly switch the rotor so that it tilted to the 9-o'clock position since the gap at the 9-o'clock electrode is too large and would require a large voltage. However, the gaps at the 2-o'clock and 4-o'clock electrodes can be very small. These gaps would be just slightly larger than the minimum allowable gap which occurs at the 3-o'clock position as it is being driven. Therefore, the way to move the rotor so that it tilts toward 9-o'clock is to sequentially step through the drive electrodes in either direction from 3-o'clock to 9-o'clock. The key point is that the gap at each electrode is very small when that electrode is to be energized. Thus, high voltages are not required. Furthermore, stiction should be much less of a problem because the motor does not rely on a spring which stores energy to be able to break a contact. Instead, the rotor is actively and strongly driven from position to position.

The frequency of operation (of these devices) is generally achieved by the selection of electrical values of related components including one or more resistors, inductors and/ or capacitors. To change frequency selection requires the change of at least one of the components previously employed for a first frequency. The change can be achieved by switching out or removing the desired component(s) and switching in or inserting the desired replacement components. Alternatively, the change can also be achieved by varying the value of one or more components.

SUMMARY OF THE INVENTION

Devices for use in highly integrated radio frequency transceivers utilize microelectro-mechanical systems, or wobble motors, to form superior switches and to select and vary components that determine different frequencies of operation. Each device has a substrate with concentric rings of electrodes and contacts. A circular rotor is centrally pivoted or wobbled to engage the contacts along its circumferential edge. The rotor may be mechanically or materially modified to create symmetric or asymmetric forms which interact with one or more stationary capacitor electrodes on the substrate. The positioning of the rotor forms in terms of rotation, overlap and separation, relative to the capacitor electrodes, varies the capacitance.

While these devices may be capable of operating at high speeds and with extremely long lifetimes, the primary application envisioned for these devices is not for high-bandwidth switching or servo-control. Rather, these devices may be used in reconfiguring a radio to operate in a different band, or to change operating parameters on a relatively slow and/or infrequent basis.

In the preferred embodiment, the invention achieves the selection of desired capacitance values. It is well known that the capacitance value of a capacitor is dependent on the material, size, and the gap or space between adjacent plates or electrodes. With everything else remaining constant, the capacitance will change when the gap changes. When employed in an appropriate circuit with other resistive and/or inductive and/or capacitive components, the circuit achieves the detection of a predetermined frequency.

The invention utilizes the second type of wobble motor described above to achieve the selection of components to change the frequency of operation of a related detector. In some cases, the only variation that is achieved by positioning the rotor with respect to the stator is to change the gap of a capacitance. The other components of the related circuit are elsewhere. However, in other cases, at least some of the related circuit components can be included on one or both of the rotor and the stator. For simplicity, such embodiments are not illustrated.

Since the wobble motor employed herein is operational as a selector of a capacitance value causing a frequency value selection, the device is referred to as a "wobble disc selector," but it will be understood by that term that the second type of wobble motor that has been described above is being employed.

BEST MODE FOR CARRYING OUT THE INVENTION

Figure 1:
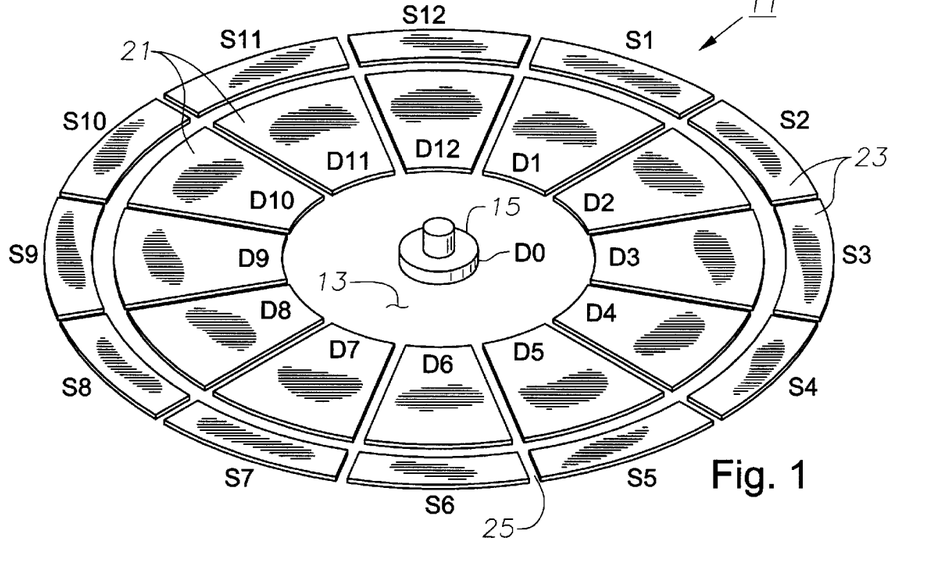
FIG. 1 is a schematic, isometric drawing of a portion of a wobble motor switch constructed in accordance with the invention.
Figure 2:
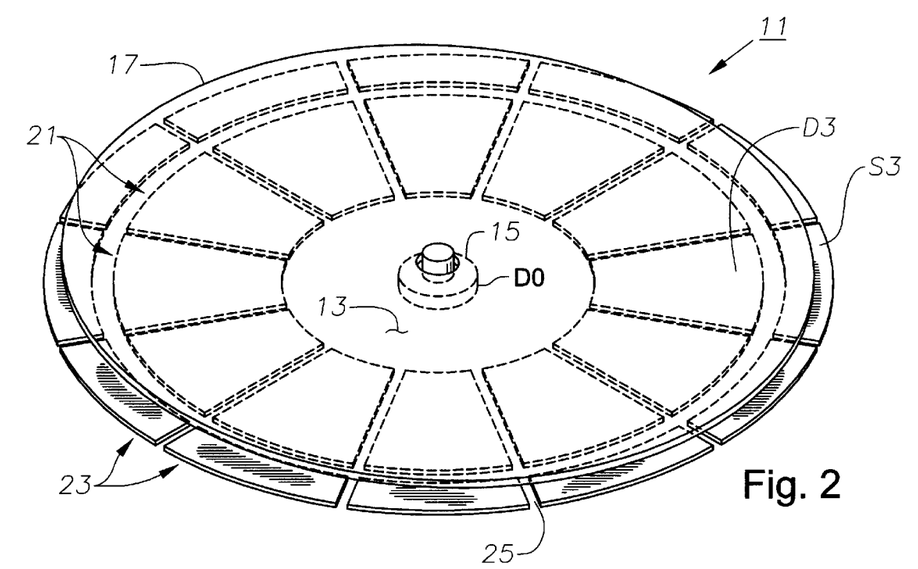
FIG. 2 is a schematic drawing of the switch of FIG. 1 with a rotor in operation with a single drive electrode energized.
Figure 3:
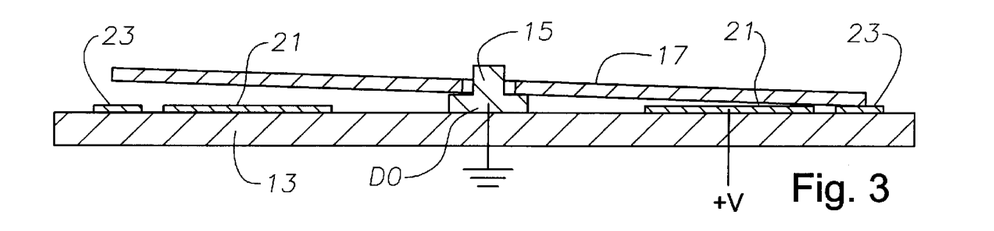
FIG. 3 is a sectional side view of the switch of FIG. 2.

Referring to FIGS. 1–3, a wobble motor or wobble disc selector switch 11 of the second or variable peripheral gap type (described above in the Background of the Invention) is shown. Although both types of wobble motors are suitable for RF circuits, the second type is preferred for forming an ideal switch. Switch 11 has a nonconductive, substantially planar stator or substrate 13 with a central support post 15 and a center contact or electrode D0, and a conductive circular rotor 17 (FIGS. 2 and 3). Substrate 13 also has a pair of concentric bands or rings including a drive ring 21 and a switch ring 23. In FIG. 2, rotor 17 is shown transparent so that the invention may be more easily understood. Rotor 17 would normally be constrained vertically by some mechanical feature such as a lip on the top of support post 15 (not shown). It should be apparent that the central support post 15 and center electrode D0 could also be formed on rotor 17 (not shown).

Each ring 21, 23 is formed from an annular array of twelve elements. Drive ring 21 has a set of twelve drive electrodes D1–D12, and switch ring 23 has a set of twelve switch contacts S1–S12. Although switch 11 is shown with 12 elements, a larger or smaller number of elements could be employed, if desired. Drive ring 21 is radially positioned between center contact D0 and switch ring 23. The outer diameter of drive ring 21 is also smaller than that of rotor 17. In the preferred embodiment, each drive electrode D1–D12 is radially aligned with one switch contact S1–S12, so that each drive electrode D1–D12 can pull rotor 17 down to contact its associated switch contact S1–SI2. In FIGS. 2 and 3, drive electrode D3 is actuated and rotor 17 is tilted to the right in communication with switch contact S3 at the 3-o'clock position.

A simple capacitive drive scheme is used to drive the motor of switch 11 with drive electrodes D1–D12. Thus, there is no need for an insulation layer on either rotor 17 or drive ring 21 since they never make contact. Switch ring 23 forms a narrow, uninsulated band around the perimeter of ring 21. The inner and outer diameters of switch ring 23 are slightly smaller and larger, respectively, than the outer diameter of rotor 17. This geometry positions the circumferential edge of rotor 17 near the radial center of switch ring 23. Therefore, when the edge of rotor 17 tilts down toward substrate 13, it comes into direct contact with one or more of the contacts S1–S12 of switch ring 23. In one embodiment, the underside of the periphery of rotor 17 is tapered or beveled to improve electrical continuity between rotor 17 and switch ring 23.

Figure 4:
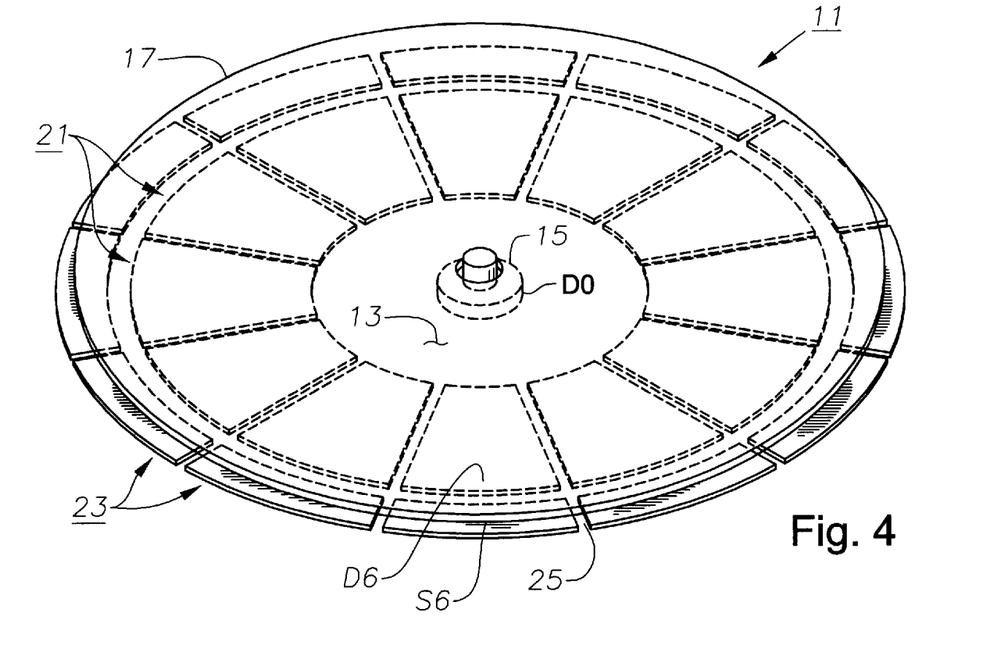
FIG. 4 is a schematic drawing of the switch of FIG. 2 at an alternate position.

There are two fundamental ways to use switch 11. If the center electrode D0 is used as a contact, then the wobble motor is used to connect the common center electrode D0 to any one of the individual switch contacts S1–SI2. This is done by rotating the wobble motor until the drive electrode nearest the desired switch electrode is energized. For example, in FIG. 4 drive electrode D6 is energized and rotor 17 (shown transparent) is in communication with switch contact S6. Whenever rotor 17 is tilting in a particular direction, it is connected through two contact points: one at central electrode D0 and one along its outer edge at switch ring 23. This first switching scheme is essentially a single pole, multi-throw switch.

Figure 5:
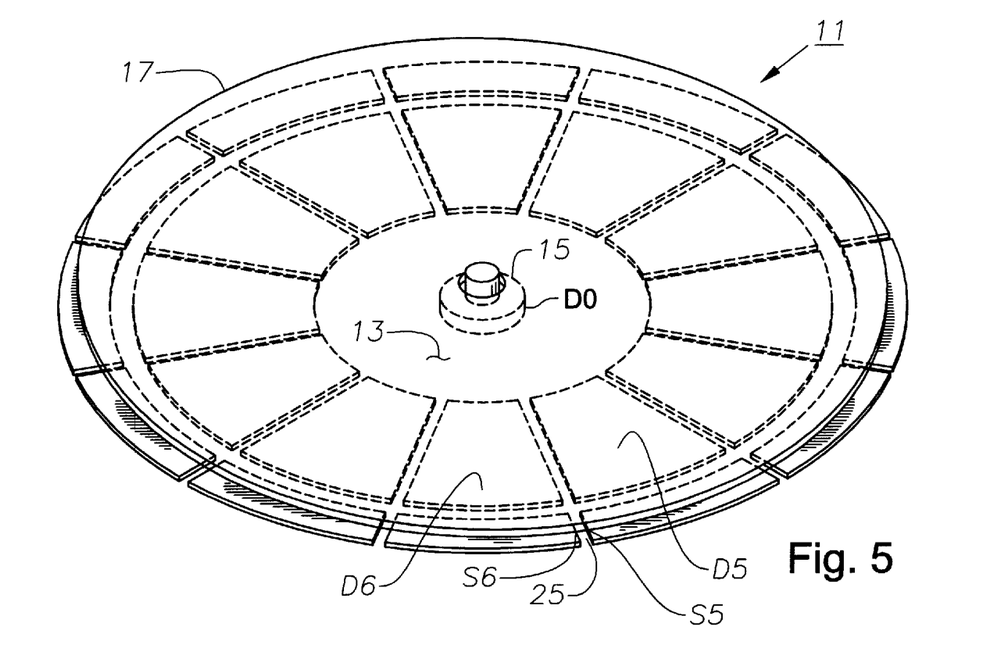
FIG. 5 is a schematic drawing of the switch of FIG. 2 with two drive electrodes energized.

If the switch contacts S1–S12 are raised or elevated above the surface of substrate 13, there will be a recess 25 or "pot hole" between each adjacent pair. With this design, if two adjacent ones of the drive electrodes are simultaneously energized (D5 and D6, for example, in FIG. 5), rotor 17 can simultaneously contact the adjacent edges of switch contacts S5 and S6. In other words, rotor 17 will attempt to contact substrate 13 at the recess 25 between switch contacts S5, S6. Rotor 17 will continue to tilt until it contacts both switch contacts on either side of the "theoretical" contact point (recess 25) on substrate 13.

Figure 6:
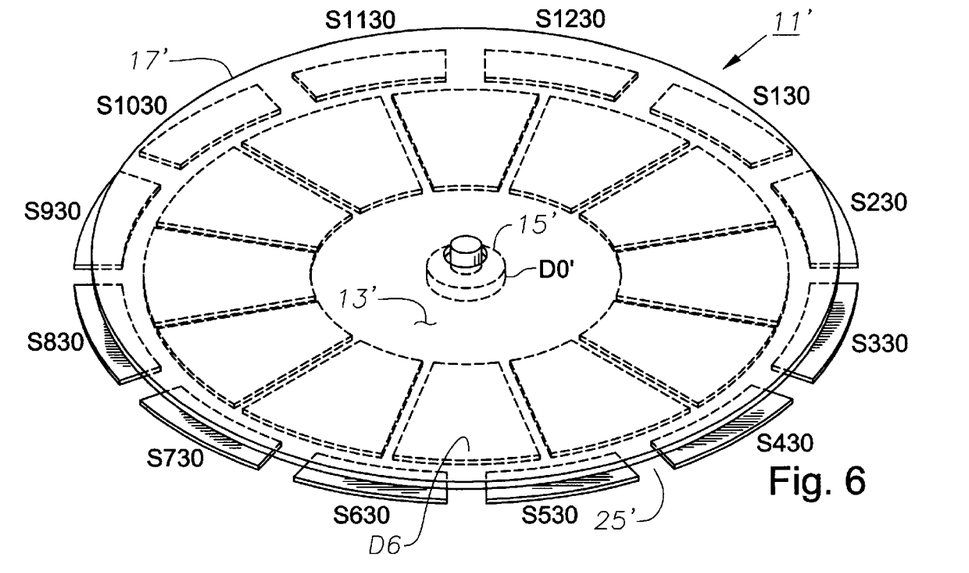
FIG. 6 is a schematic drawing of a portion of a second embodiment of the switch of FIG. 2.

This ability to simultaneously contact two adjacent ones of the switch contacts S1–S12 enables a second possible switching scheme. In this scheme, center electrode D0 is not used as a contact, and rotor 17 is essentially an "electrically floating" element. By tilting rotor 17 so as to simultaneously contact two adjacent ones of the switch contacts S1–S12, the conductive rotor 17 can electrically connect them together. This may be done either by energizing two adjacent ones of the drive electrodes D1–D12 that are in line with the subject switch contacts (FIG. 5), or by energizing a single one of the drive electrodes (D6' in FIG. 6) which would be centered along a radial line going between switch contacts S530 and S630. In the latter case, the drive electrodes D1'–D12' are not radially aligned with switch contacts S130–S1230. Switch contacts S130–S1230 are each shifted by 15 degrees relative to their counterpart switch contacts S1–S12 in the first case. Switch contacts S130–S1230 are also slightly smaller and spaced further apart to define a larger gap or recess 25'. In either case, the electrical connection would be made exclusively along the circumferential edge of rotor 17. The signal would come from one switch contact into the edge of rotor 17 at one contact point, travel a short distance through the rotor 17 around its periphery to the second contact point, and then out into the second switch contact.

Figure 7:
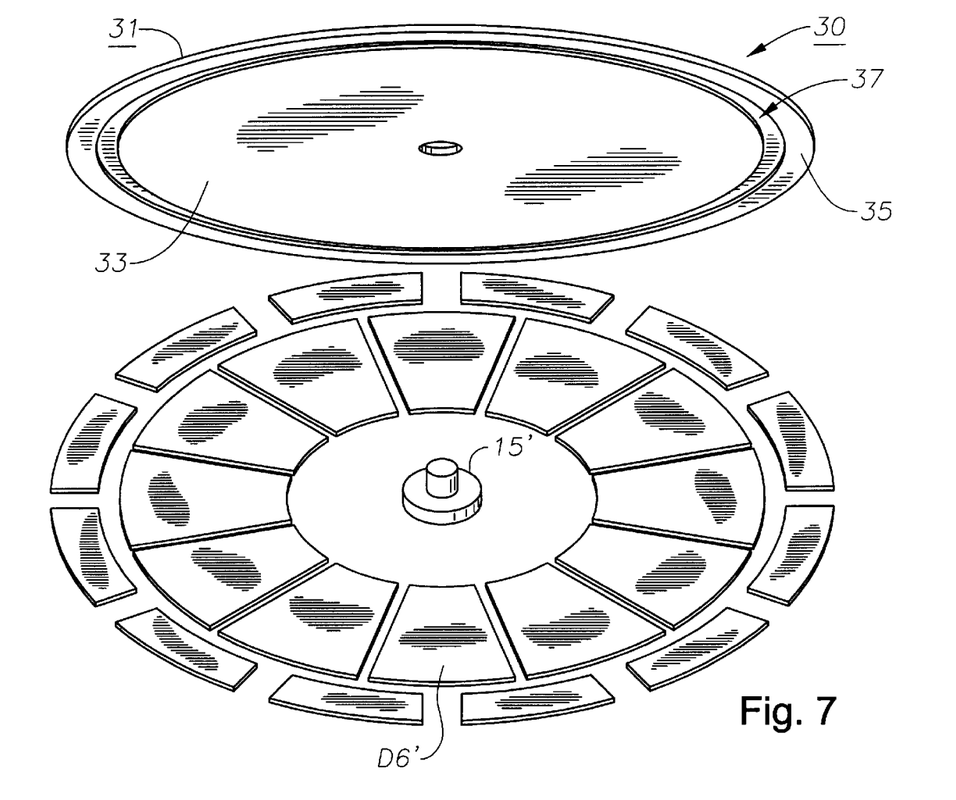
FIG. 7 is a schematic drawing of the switch of FIG. 6 with a rotor that is lifted.
Figure 8:
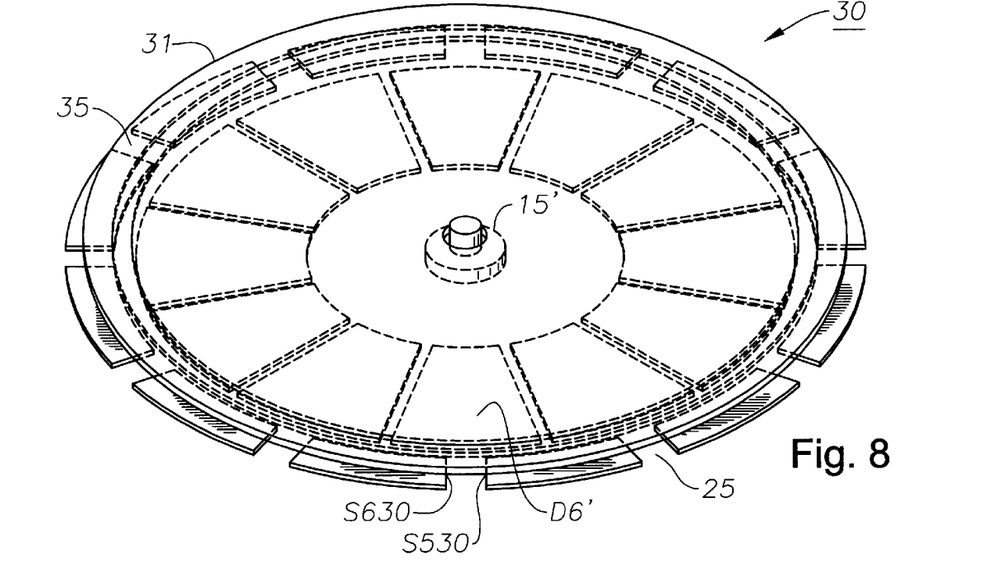
FIG. 8 is a schematic drawing of the switch of FIG. 7 in operation.

An alternate embodiment of the second switching scheme is depicted in FIGS. 7 and 8. In this version, a switch 30 has a rotor 31 with a conductive inner drive surface 33 and a conductive, narrow outer ring 35 which surrounds surface 33. Ring 35 is separated from surface 33 by a narrow, non-conductive ring 37. In FIG. 7, rotor 31 is in an exploded position to better illustrate the invention. This is not an operational position for rotor 31. In FIG. 8, a single drive electrode D6 is energized to draw ring 35 of rotor 31 into contact with the adjacent edges of switch contacts S530 and S630, which are shorted together by ring 35. This allows the two contacts to be connected together, regardless of their voltage relative to the drive electrodes D1–D12 or the ground point at the support post 15.

In one version of the previous embodiments, the rotor is completely uniform so the capacitance between the rotor and the fixed electrodes is independent of the rotational orientation of the rotor. Thus, if the wobble motor were equipped with a non-uniform rotor, the wobble motor could be converted into a variable capacitor. As shown in FIGS. 9–17, there are several ways to make the rotor non-uniform, including:

1. The addition of holes or slots in selected regions of the rotor;
2. Varying the dielectric constant of the rotor in selected regions;
3. Varying the material that the rotor is formed from;
4. Varying the thickness of the conductive portions of the rotor in selected regions.

Figure 9:
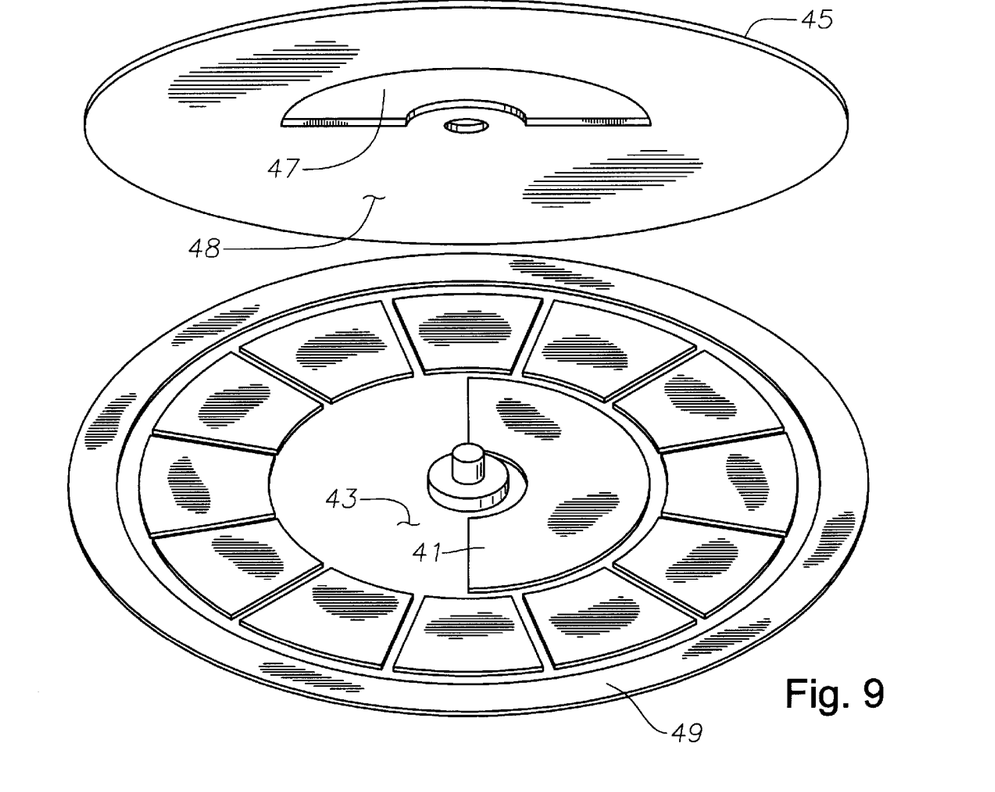
FIG. 9 is a schematic drawing of a wobble motor variable capacitor that is constructed in accordance with the invention.

With any of these modifications, or other changes to the rotor in various radial regions, the capacitance between the rotor and the fixed electrodes on the substrate can be a function of the rotational orientation of the rotor. As described for switch 11 above, there are two fundamental ways to create a variable capacitor in this regard. If the central support post of the motor is used as an electrical contact and if the rotor is at least partially conductive, then a variable capacitor is formed directly between the rotor and the fixed electrodes. However, if the post is not an electrical contact, then the "electrically floating" rotor can be used to vary the mutual capacitance between two electrodes. These electrodes 39, 40 could be positioned side by side (FIG. 14), or, as shown in FIG. 9, one electrode 41 could be on the surface of the substrate 43 while a rotor 45 with a removed section 47 and an electrode 48 is suspended above it with space between them. In the latter case, at least a portion of the rotor can be positioned in the space. These devices also have a continuous edge contact ring 49 around the perimeter of substrate 43.

Figure 10:
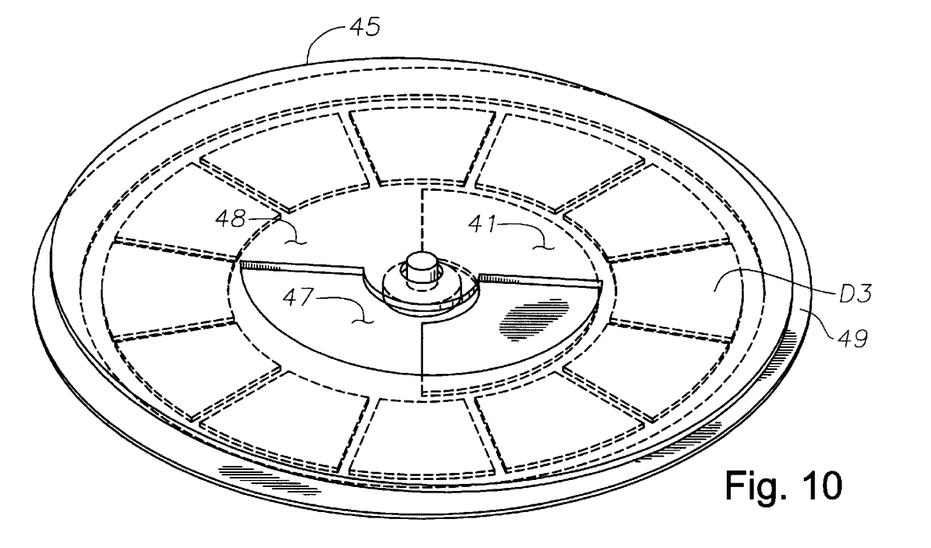
FIG. 10 is a schematic drawing of the capacitor of FIG. 9 in operation.
Figure 11:
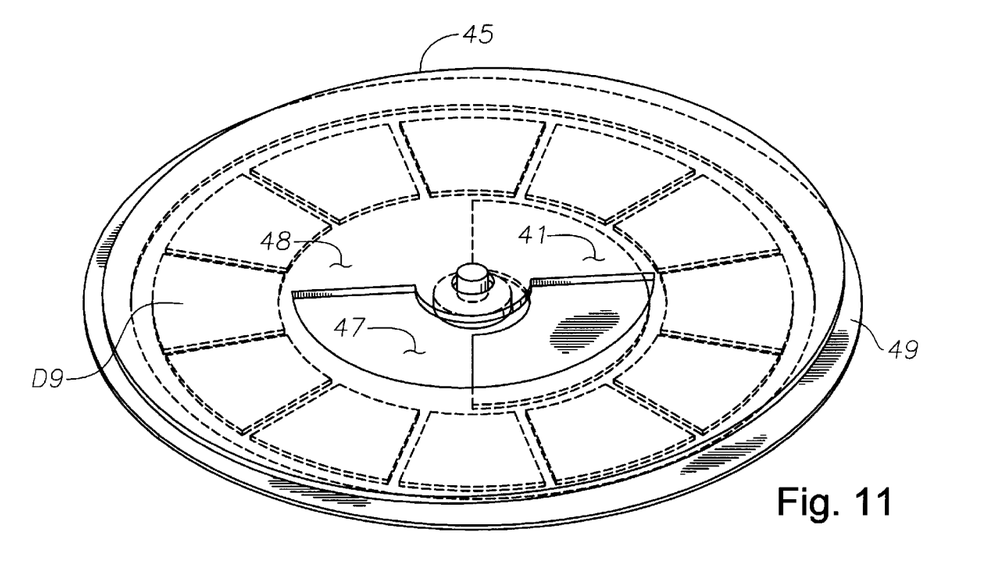
FIG. 11 is a schematic drawing of the capacitor of FIG. 9 in operation at an alternate position.
Figure 12:
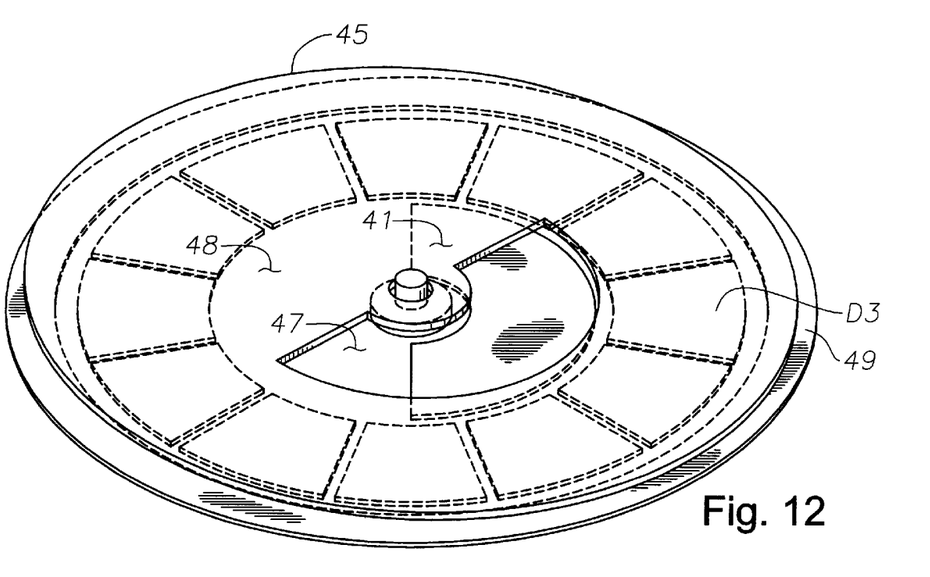
FIG. 12 is a schematic drawing of the capacitor of FIG. 9 in operation at another position.
Figure 13:
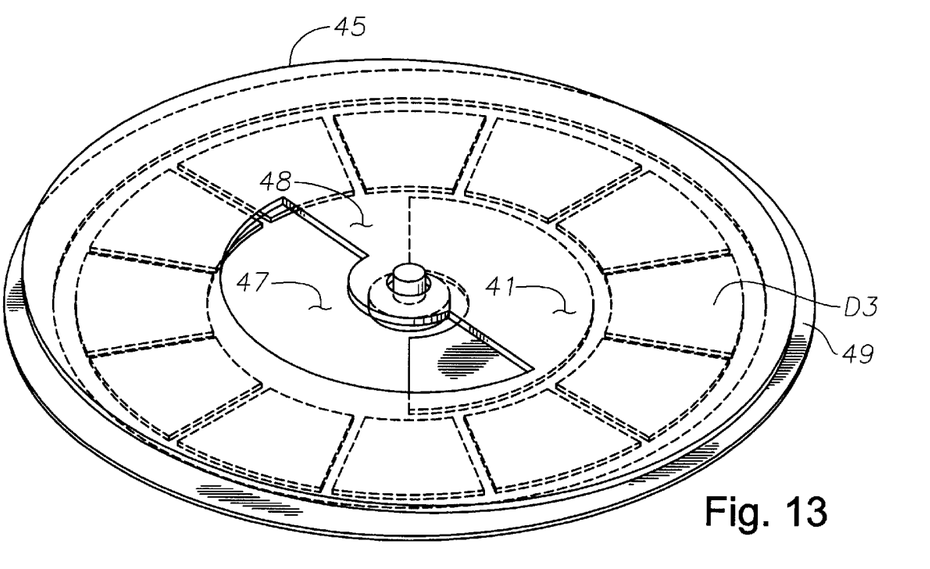
FIG. 13 is a schematic drawing of the capacitor of FIG. 9 in operation at yet another position.
Figure 14:
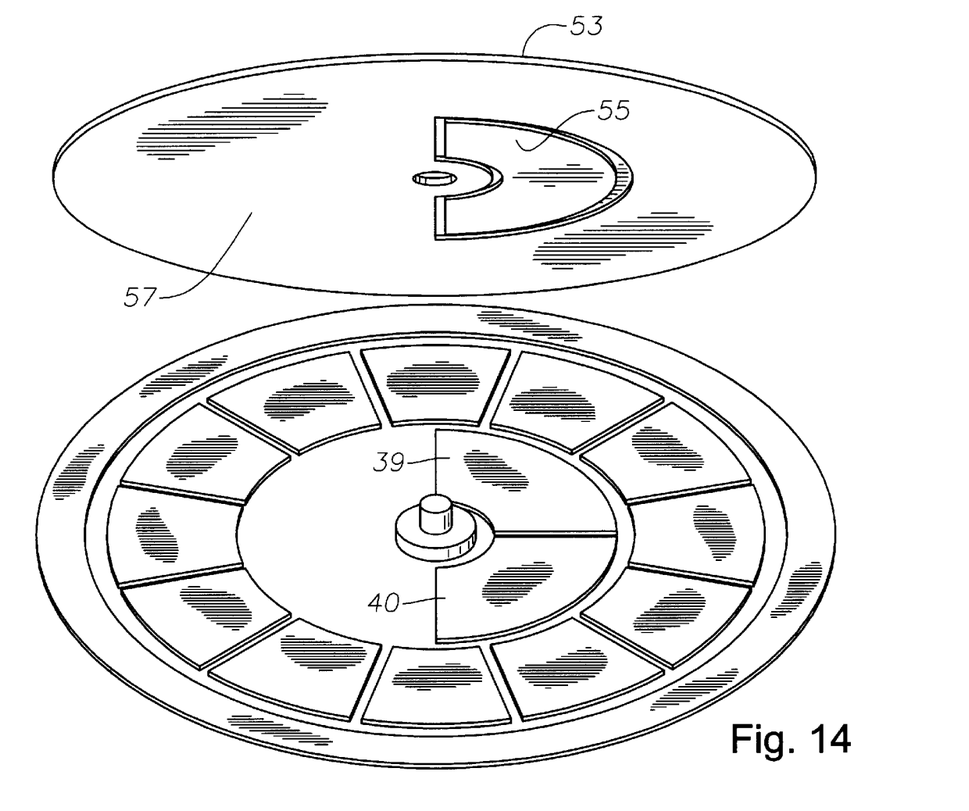
FIG. 14 is a schematic drawing of a second embodiment of the capacitor of FIG. 9.
Figure 15:
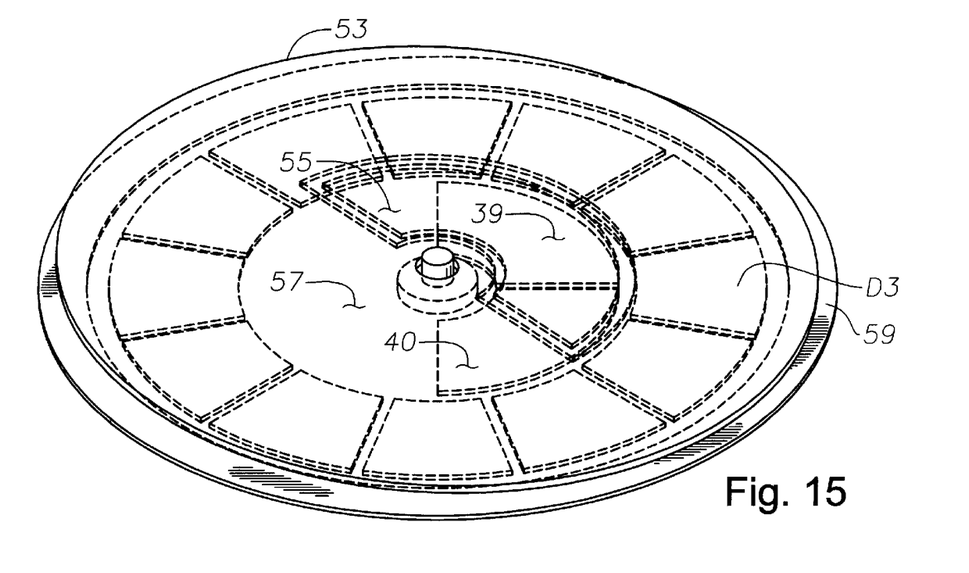
FIG. 15 is a schematic drawing of the capacitor of FIG. 9 in operation.

Since the wobble motion has large angular motion capability, it is possible to make the capacitance adjustable over a very wide range. For example, in FIGS. 10–13, this might be done by moving the electrode 48 on the rotor 45 over the stationary electrode 41 so that the overlap region varies from essentially zero to 100 percent. In FIG. 10, the variable capacitor is shown with 50% overlap and drive electrode D3 energized. In FIG. 11, there is also 50% overlap, but drive electrode D9 is energized. Note that the capacitance changes as a function of the tilt angle and of the overlap. In FIG. 12, the variable capacitor is shown with 25% overlap between electrodes 41, 48, and with drive electrode D3 energized. The capacitance can be changed by repeatedly energizing all of the drive electrodes D1–D12 in sequence until the rotor 45 has rotated sufficiently to change the overlap area of the capacitor. In FIG. 13, there is 75% overlap which is obtained after repeatedly cycling through all the drive electrodes D1–D12 in sequence, and then ending with the D3 drive electrode energized. If finer control of the capacitance is required, then the rotor can be fabricated with a less dramatic change in electrical properties so that a large change in physical overlap areas creates a smaller change in capacitance. As stated above, this could be accomplished by varying the thickness or dielectric constant of the rotor.

Referring again to FIG. 14, a substrate 51 has capacitor electrodes 39, 40 which are positioned side by side. Rotor 53 has a conductive capacitor coupling surface 55, and a conductive drive rotor surface 57. Surface 55 controls the mutual capacitance between electrodes 39, 40. For example, in FIG. 15, surface 55 is shown with 50% overlap with electrode 40, and with drive D3 energized to pull rotor 53 into contact with ring 59.

Figure 16:
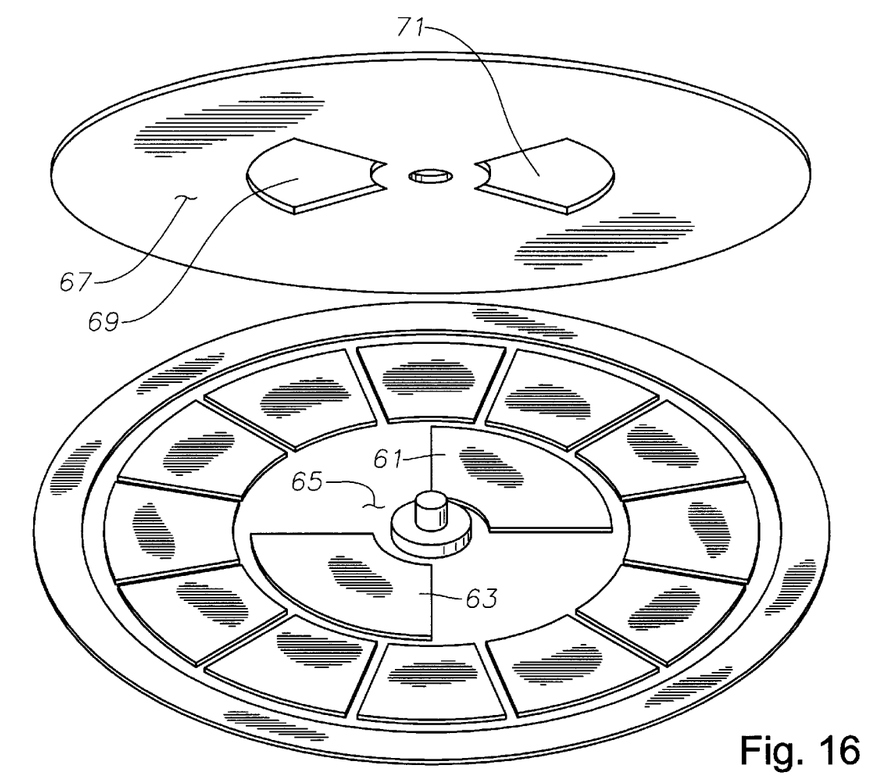
FIG. 16 is a schematic drawing of a third embodiment of the capacitor of FIG. 9.
Figure 17:
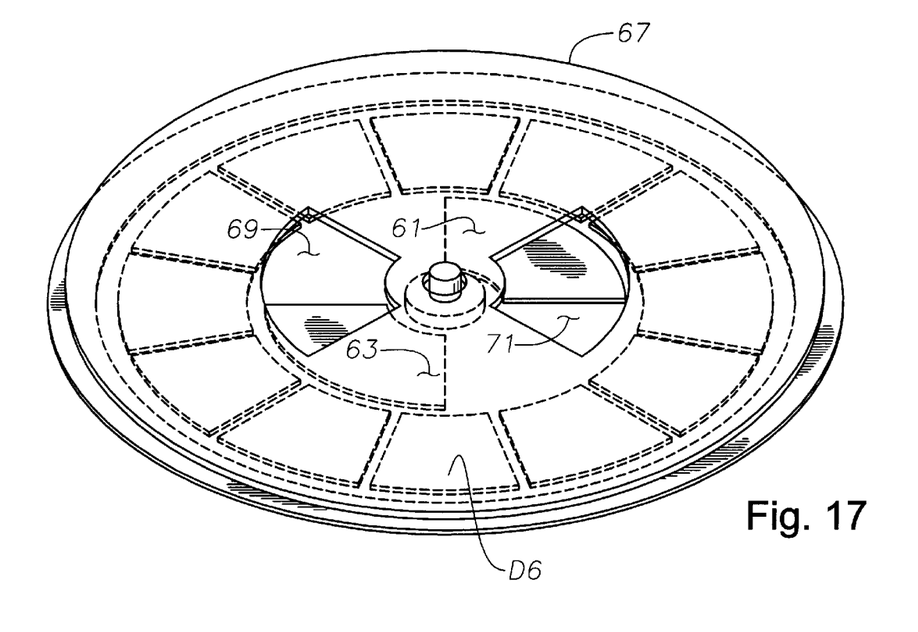
FIG. 17 is a schematic drawing of the capacitor of FIG. 16 in operation.

In FIG. 16, dual variable capacitors are created between two electrodes 61, 63 on a substrate 65, and the rotor surface 67 which has two symmetric sections 20 69, 71 removed. As shown in FIG. 17, a 50% overlap on both electrodes 61, 63 is achieved by surface 67 with drive electrode D6 energized. The capacitance changes as a function of the tilt angle and of the overlap area.

One potential challenge with this approach is that the capacitance would vary slightly if the gap between the rotor and the substrate is not fixed and constant. This would be particularly true if there was only one gap between the rotor and the one or more fixed electrodes. However, if the fixed electrodes are arranged above one another with a space between them into which the rotor moves, then the effect of vertical rotor position on capacitance can be greatly reduced if the rotor is nominally positioned in the middle of that space.

One other disadvantage of the wobble motor capacitor is that the capacitance may not increase monotonically as the driving electrodes are energized in sequence. This is because the rotor goes through an entire cycle of tilt angles while the capacitor overlap area only changes slightly. Therefore, if tilt angle changes have a large enough effect on capacitance, then the capacitance may not change monotonically but might instead look something like a ramp with a sine wave superimposed on top.

Fortunately, neither of these problems are severe in the present RF applications because the variable capacitance needed in these devices does not have to be particularly accurate or stable in an absolute sense. Feedback circuits are used to control critical circuit capacitances so as to create the desired resonant frequencies. It is not necessary for a single variable capacitor to perform all functions. Therefore, a large variable capacitor may be adjusted through a large range using a wobble motor approach as described above. In addition, a separate smaller variable capacitor (either MEMS-based or just a smaller semiconductor) may be incorporated for the real-time servo-control of resonant frequency. In this case, the variable capacitor does not have to be monotonic during every phase of wobble-motor excitation. The rotor would always be stopped at the same tilt angle (i.e. with the same drive electrode energized) and the wobble motor would be rotated through some number of complete excitation stages until the capacitance at the desired phase of excitation reached the target value.

In the preceding paragraph, the wobble motor is used primarily as an incrementally variable, fixed capacitor. However, it is also possible to drive such a system in a hybrid fashion to create a high-bandwidth servo-controllable capacitance. Even if the capacitance does not increase monotonically as a function of the phase excitation, as long as the range of servo-controlled capacitance required is small, the wobble motor can be driven in a hybrid digital/analog manner that allows high-bandwidth, analog control of the capacitance over a large range. For example, assume that the motor has phases A, B, C, etc., and there is a small but approximately linear variation in capacitance between phase A, B and C energization. In the digital phase of this hybrid drive scheme, the phases would be driven via an appropriate series of digital pulses to rotate the rotor until the capacitance when phase B is energized reaches the nominal desired capacitance. In the second, analog phase of this hybrid drive scheme, phases A, B and C are driven in an analog manner. This may be accomplished with a fixed voltage on phase B and with voltages on A and C that change in opposite directions. In this manner, the rotor can be used as a continuously variable capacitor, driven under servo control by a signal that increases or decreases phase C voltage while simultaneously decreasing or increasing phase A voltage. The range of this analog control is limited to only a small amount, but that is precisely what the RF circuits require—a capacitor that can occasionally, and relatively slowly, be varied over a large range in order to change radio "modes", and then can be servo-controlled over a much smaller range in order to maintain a lock on a specific frequency.

It is also possible to create wobble motor-based devices where the rotor is designed to simultaneously affect or adjust more than one component as it is rotated. One example (FIGS. 16 and 17) would be a rotor with two symmetric halves and two sets of stationary electrodes arranged such that two separate capacitors are both adjusted in the same direction at the same time. This might be very useful when more than one stage of an RF transceiver (or one stage in the transmit section and a corresponding stage in the receiver section) are to be adjusted simultaneously (e.g. when switching frequency bands). Of course, by changing the location of the fixed electrodes, the system could be designed so that one capacitor increases while the second capacitor decreases rather than having both devices increase or decrease together. Furthermore, the number of devices could be more than two, and the devices need not be all the same. For example, a single rotor could be used to simultaneously adjust both a capacitor and an inductor.

Figure 18:
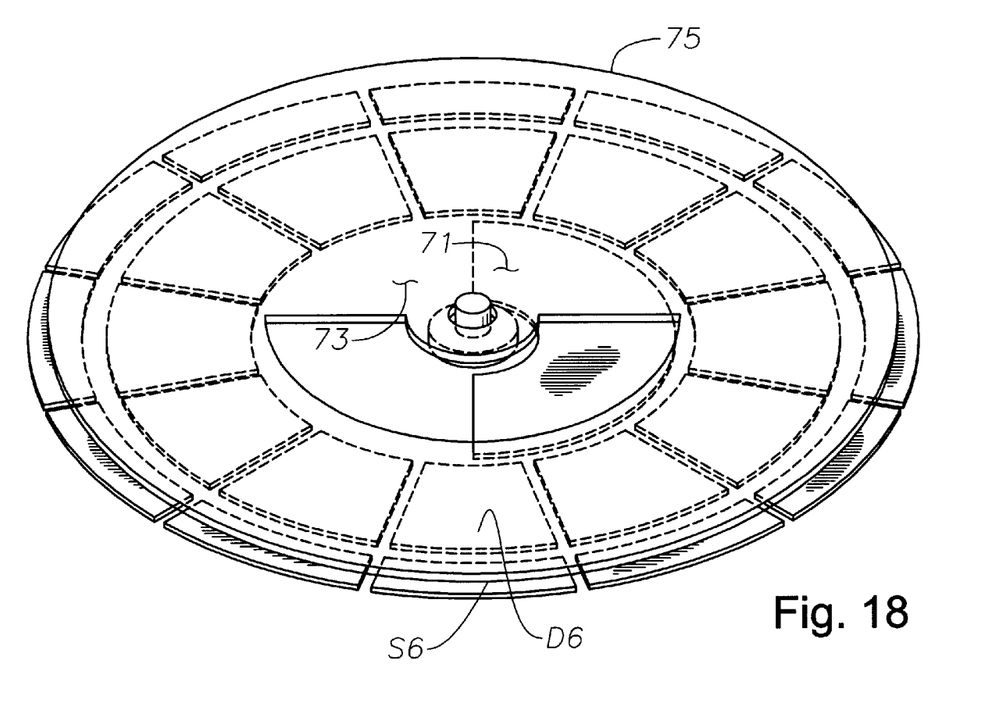
FIG. 18 is a schematic drawing of a combined wobble motor variable capacitor and switch constructed in accordance with the invention.

In a final embodiment (FIG. 18), both a variable element and a switch may be combined into a single wobble motor device. Such an application is feasible if the precision required on the variable element is not too extreme. For example, if the rotor for the switch 11 described above is also designed so as to adjust a capacitor or other device during rotation, then it would be possible to repeatedly cycle through all of the switch settings until the capacitance was close to the desired value, and then to stop the cycle with the desired phase energized. At the end of this process, the capacitance has been adjusted to the nearest level achievable with the desired phase energized, and the desired switch contact has been made. It should be readily apparent that although only one combination switch/variable capacitor is shown, virtually any combination of the elements described in this specification may be employed. In FIG. 18, one version of a combined variable capacitor and switch are shown with 50% overlap between a fixed electrode 71 and the ground plane 73 of rotor 75. Drive electrode D6 is energized and switch contact S6 is connected to ground.

If an extremely large range of adjustment is required together with a very fine level of control, then multiple variable devices can be electrically connected together. In this scenario, one wobble motor-driven device adjusts a "coarse adjustment" capacitor with a large range of value, to a value near the desired value. Then a second wobble motor-driven device which has a much smaller total range of adjustment is rotated until the combination of both devices is brought as near the desired value. This process can continue indefinitely, with each subsequent device having a total adjustment range that is on the same order as the maximum adjustment error expected from the previous device. As the total range of adjustment gets small enough, it may become feasible to use a solid state variable device, such as a varactor, to perform the final adjustment. In this case, the undesirably high losses in the solid state device will have a much smaller effect on the overall system performance (e.g. Q-factor) since the device represents only a small fraction of the total capacitance, etc.

While it is possible to incorporate MEMS devices along with other semiconductor devices, it is not generally cost-effective to integrate passive devices on a single radio chip. A better solution is to integrate most, if not all, of the passive devices onto one chip, and to integrate most or all of the active radio devices onto another chip, and then connect these two chips together. Any number of packaging approaches could be used, including chip stacking, multi-chip modules, wire-bonding, conventional printed circuit boards, etc. In any case, the goal is to enable the integration of most or all of the passive devices that cannot be efficiently integrated onto the radio chip onto a single secondary substrate, and to make use of MEMS techniques to create very high quality variable capacitors, switches, etc., which can be used to enable the creation of extremely compact, frequency-agile, programmable RF transceivers.

The invention has several advantages. The first switching scheme can be used with a perfectly flat rotor/electrode surface. It has no depressions or "pot holes" into which the rotor could fall, which could require additional power in order to get out. The second switching scheme allows more flexibility in the electrical switching. The "pot holes" between the switch contacts provide built in detent positions to help hold the rotor at a given position. The switches use low drive end voltages, and have low contact resistance and high linearity because of the mechanical switch action. The switches may comprise multi-pole and/or multi-throw switches. The switches also have high actuation forces to minimize stiction problems. The variable capacitors and/or inductors have very large adjustment ranges, low losses and, therefore, high-Q's. They are digitally adjustable with stable values, and have low stiction and actuation voltage. They are also capable of hybrid control with analog servo-control over a limited range at a given digital "setting".

While the invention has been shown or described in only some of its forms, it should be apparent to those skilled in the art that it is not so limited, but is susceptible to various changes without departing from the scope of the invention. For example, while this description has been focused on an electrostatically-driven wobble motor, it should be clear that the electrostatic drive electrodes could be replaced with electromagnetic actuators if the rotor were formed from a partial or complete layer of magnetic material. A variable inductor could be similarly created.

I claim:

1. A wobble disc selector, comprising:
   a substantially planar stator having a substrate with a central pivot;
   an annular array of switch contacts mounted on the substrate of the stator and being substantially concentric with the central pivot;
   an annular array of drive elements mounted on the substrate of the stator and being substantially concentric between the central pivot and the array of switch contacts, wherein at least one of the drive elements is associated with each of the switch contacts;
   a circular, substantially planar, electrically conductive rotor mounted to the central pivot such that a center point of the rotor is axially spaced-apart from a center point of the stator, the rotor having an outer perimeter and being substantially concentric with the stator, the rotor also being tilted about the central pivot relative to a plane of the stator such that the perimeter is aligned with and touches the array of switch contacts; and wherein
   in response to the activation of at least one drive element, the rotor is movable to a plurality of switch positions wherein a circuit is formed exclusively along the perimeter of the rotor between the perimeter of the rotor and two associated ones of the switch contacts.

2. The wobble disc selector of claim 1 wherein the drive elements and the switch contacts are equal in number.

3. The wobble disc selector of claim 1 wherein each of the drive elements is radially aligned with one of the switch contacts.

4. The wobble disc selector of claim 1 wherein the drive elements are radially misaligned with the switch contacts.

5. The wobble disc selector of claim 1 wherein the central pivot is electrically insulated.

6. The wobble disc selector of claim 1 wherein each of the drive elements is an electrode.

7. The wobble disc selector of claim 1 wherein each of the drive elements is an electromagnet.

8. The wobble disc selector of claim 1 wherein a plurality of the drive elements are activated at at least one of the switch positions.

9. The wobble disc selector of claim 1, further comprising at least one stationary capacitor electrode mounted to the substrate of the stator; and wherein
   each of the switch positions tilts the rotor relative to the stator to define a gap between the rotor and the capacitor electrode to establish a variable capacitance value therewith for circuit application.

10. The wobble disc selector of claim 9, further comprising a formation on the rotor; and wherein
    an amount of overlap between the formation and the capacitor electrode is manipulated by cycling the rotor between the switch positions to further vary the capacitive value therewith for circuit application.

11. The wobble disc selector of claim 10 wherein the formation is a conductive capacitor coupling surface.

12. The wobble disc selector of claim 11 wherein the capacitor electrode on the substrate comprises two capacitor electrodes.

13. The wobble disc selector of claim 12 wherein the two capacitor electrodes are located adjacent to each other.

14. The wobble disc selector of claim 12 wherein the two capacitor electrodes are spaced apart from each other on opposite sides of the central pivot.

15. The wobble disc selector of claim 10 wherein the formation is a hole in an underside of the rotor.

16. The wobble disc selector of claim 10 wherein the formation is a pair of holes in an underside of the rotor.

17. The wobble disc selector of claim 16 wherein the pair of holes are spaced apart from each other on opposite sides of the central pivot.

18. The wobble disc selector of claim 1 wherein the rotor rotates about the central pivot with respect to the stator.

19. The wobble disc selector of claim 1, further comprising at least one electrical component associated with one of the stator and the rotor for at least one of said switch positions.

20. The wobble disc selector of claim 19, wherein said electrical component is frequency determinative.

21. A wobble disc selector, comprising:
    a substantially planar stator having a substrate with an electrically conductive central pivot;
    an annular array of switch contacts mounted on the substrate of the stator and being substantially concentric with the central pivot;
    an annular array of drive elements mounted on the substrate of the stator and substantially concentric between the central pivot and the array of switch contacts, wherein the drive elements and the switch contacts are equal in number and radially aligned with one another, and wherein at least one of the drive elements is associated with each of the switch contacts;
    a circular, substantially planar, electrically conductive rotor mounted to the central pivot such that a center point of the rotor is axially spaced-apart from a center point of the stator, the rotor having a formation an outer perimeter, and being substantially concentric with the stator for rotation about the central pivot with respect to the stator, the rotor also being tilted about the central pivot relative to the stator such that the perimeter is aligned with and touches the array of switch contacts;

at least one stationary capacitor electrode mounted to the substrate of the stator, wherein in response to the activation of at least one drive element, the rotor is movable to a plurality of switch positions wherein a circuit is formed between the central pivot, the rotor and one associated switch contact, wherein each of the switch positions tilts the rotor relative to the stator to define a gap between the rotor and the capacitor electrode to establish a variable capacitance value therewith for circuit application; and wherein an amount of overlap between the formation and the capacitor electrode is manipulated by cycling the rotor between the switch positions to further vary the capacitive value therewith for circuit application.

22. The wobble disc selector of claim 21 wherein each of the drive elements is an electrode.

23. The wobble disc selector of claim 21 wherein each of the drive elements is an electromagnet.

24. The wobble disc selector of claim 21 wherein the formation is a conductive capacitor coupling surface.

25. The wobble disc selector of claim 21 wherein the capacitor electrode on the substrate comprises two capacitor electrodes.

26. The wobble disc selector of claim 25 wherein the two capacitor electrodes are located adjacent to each other.

27. The wobble disc selector of claim 25 wherein the two capacitor electrodes are spaced apart from each other on opposite sides of the central pivot.

28. The wobble disc selector of claim 21 wherein the formation is a hole in an underside of the rotor.

29. The wobble disc selector of claim 21 wherein the formation is a pair of holes in an underside of the rotor.

30. The wobble disc selector of claim 29 wherein the pair of holes are spaced apart from each other on opposite sides of the central pivot.

31. The wobble disc selector of claim 21, further comprising at least one frequency determinative electrical component associated with one of the stator and the rotor for each of said drive elements.

32. A wobble disc selector, comprising:

a substantially planar stator having a substrate with an electrically insulated central pivot;

an annular array of switch contacts mounted on the substrate of the stator and being substantially concentric with the central pivot;

is an annular array of drive elements mounted on the substrate of the stator substantially concentric between the central pivot and the array of switch contacts, wherein the drive elements and the switch contacts are equal in number and radially misaligned with one other, and wherein at least one of the drive elements is associated with each of the switch contacts;

a circular, substantially planar rotor mounted to the central pivot such that a center point of the rotor is axially spaced-apart from a center point of the stator, the rotor having an electrically conductive outer perimeter and being substantially concentric with the stator, the rotor also being tilted about the central pivot relative to the stator such that the perimeter is aligned with and touches the array of switch contacts; and wherein in response to the activation of at least one drive element, the rotor is movable to a plurality of switch positions wherein a circuit is formed between the perimeter and two associated switch contacts to close the respective circuits exclusively along the perimeter of the rotor.

33. The wobble disc selector of claim 32 wherein each of the drive elements is an electrode.

34. The wobble disc selector of claim 32 wherein each of the drive elements is an electromagnet.

35. The wobble disc selector of claim 32 wherein the rotor rotates about the central pivot with respect to the stator.

36. The wobble disc selector of claim 32, further comprising at least one electrical component associated with one of the stator and the rotor for at least one of said switch positions.

37. The wobble disc selector of claim 36, wherein said electrical component is frequency determinative.

* * * * *